(No Model.)
S. W. FUNK.
BERRY PACKAGE.
No. 544,431. Patented Aug. 13, 1895.
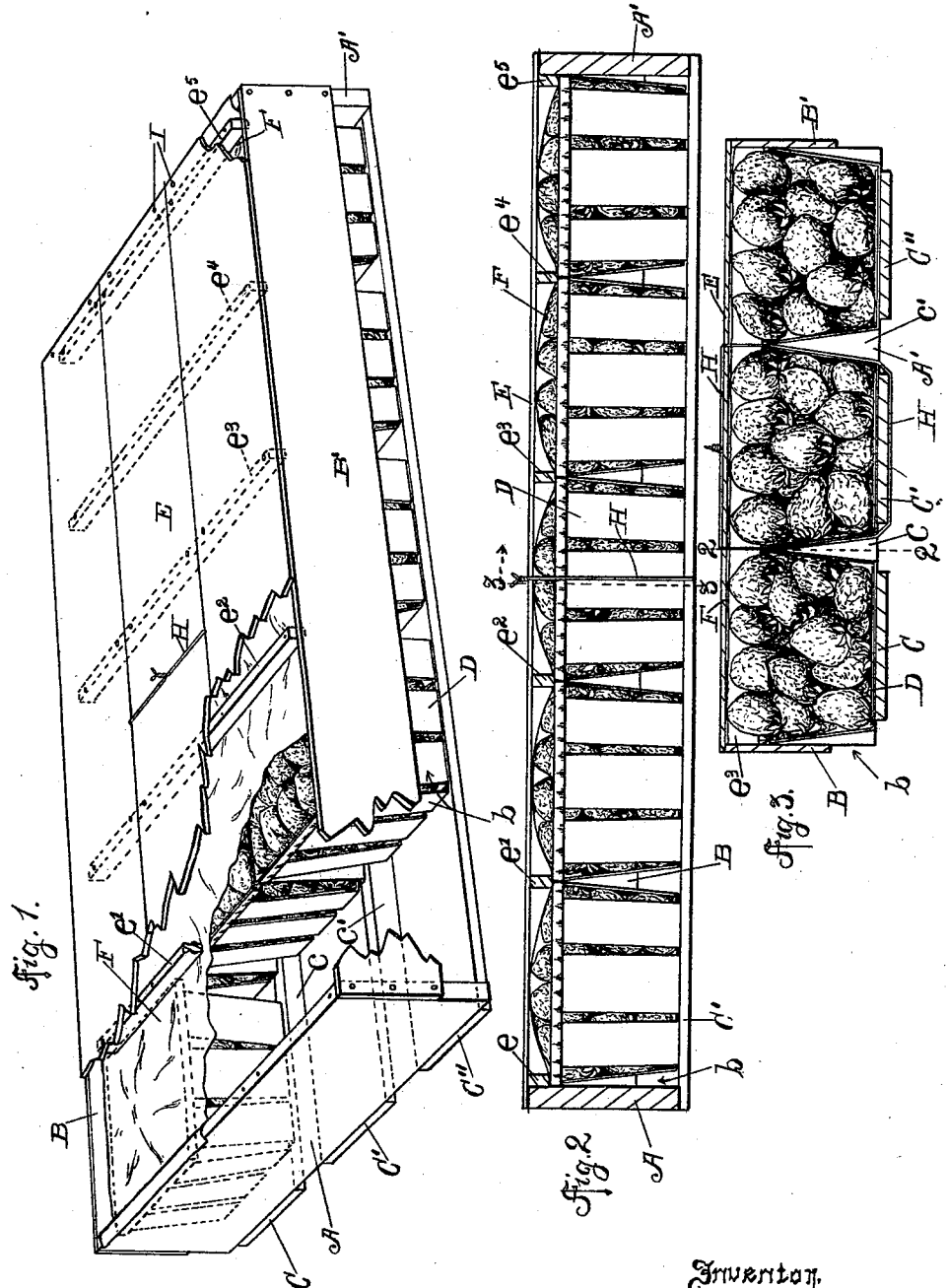
Witnesses.
P. W. Harbeson.
Alfred I. Townsend
Inventor.
Samuel W. Funk
BY
Hazard & Townsend
HIS ATTYS.

UNITED STATES PATENT OFFICE.

SAMUEL W. FUNK, OF GLENDORA, CALIFORNIA.

BERRY-PACKAGE.

SPECIFICATION forming part of Letters Patent No. 544,431, dated August 13, 1895.

Application filed February 25, 1895. Serial No. 539,615. (No model.)

*To all whom it may concern:*

Be it known that I, SAMUEL W. FUNK, a citizen of the United States, residing at Glendora, in the county of Los Angeles and State of California, have invented new and useful Improvements in Berry-Packages, of which the following is a specification.

In shipping berries from California to eastern points, difficulty has been experienced in procuring crates which will be cheap, light, and strong, but not so excessive in cost as to preclude their profitable employment. It has heretofore been the custom to ship the berries in pound baskets packed in crates holding thirty or more baskets arranged in two or three layers of such baskets arranged one above the other, with interposed partitions to hold the layers of baskets apart. These crates are necessarily quite heavy and are also expensive. On account of the cost of these crates it has been the custom to require that the crates be returned to the grower to be refilled, and the return expressage, in addition to the expressage paid for shipping the crates when filled with fruit, is an extremely heavy burden upon the growers and handicaps them in marketing their fruit. Also a large proportion, about one-half, of the crates is not returned, or is destroyed in transit, so that the fruit-grower must calculate upon losing at least one-half of the crates at each shipment. Owing to the large amount of fruit shipped in each crate, these crates are necessarily heavy to hold the weight. It is the custom for a crate containing thirty one-pound boxes of fruit to be billed by the express companies at thirty-five pounds, although the actual weight is about forty-two pounds, and this is proving unsatisfactory to the express companies handling these crates.

It is the custom for fruit-growers to arrange the top layer of fruit in each box in regular order, or to "face" the fruit, as it is termed, in order that it may present the best possible appearance when exposed for sale. In order to avoid bruising the fruit, it is necessary that the lid shall not press upon the fruit, and consequently if the crates are jostled or shaken during transit, or are inadvertently turned upside down, the fruit becomes disarranged and must be refaced by the dealer or exposed for sale in an untidy style.

One object of my invention is to produce a crate which will be so light as to be billed when filled with fruit at practically the net weight of the fruit. I utilize the strength of the fruit-baskets when packed in the crate, and thereby brace the crate in such a manner as to allow it to be made of very thin material, and yet be so strong, rigid, and durable in its construction that there will be no liability of the crate becoming broken during shipment, and yet so cheap that a new crate can be used at each shipment at about the same expense as it now costs to return the empty crates, besides which I make a saving in the cost of expressing the loaded crates, because the weight of crate per pound of fruit is much less than with crates heretofore in use. The fruit is also made more saleable by being always exposed for sale in a fresh new crate, and not in battered and stained second-hand crates, as is commonly now the case.

Another object of my invention is to provide a crate which will be arranged in such a manner as to give superior ventilation to the fruit, and will form a convenient and attractive display-case in which to expose the fruit for sale, and which may be delivered to the purchaser, together with the fruit, when sold.

A further object of my invention is to provide means for lightly yet firmly holding the fruit in its faced position in the fruit boxes or baskets during shipment, so that when the fruit is unpacked for sale it will be as perfectly faced as it was when it left the hands of the packer; also, to prevent jostling or bruising of the fruit during shipment; also, to protect the fruit from dust during transit and to add to its attractiveness when placed on sale.

My invention comprises the various features of construction and combinations of parts whereby I utilize to the utmost the entire strength not only of the case, but of its contained fruit-baskets, and produce thereby a fruit package which possesses the maximum strength with the minimum weight.

My invention also consists in the combination, in a berry-package, of rectilinear baskets arranged in rows in the frame on the bottom of the case, a lid provided with transverse truss-bars arranged to press upon the straight upper edges of the baskets, and a flexible fruit-covering sheet clamped between the truss-bars and the edges of the baskets.

The accompanying drawings illustrate my invention.

Figure 1 is a fragmental perspective view of a package embodying my invention, two of the fruit-baskets being removed therefrom and a portion of the case being broken away to expose the construction. Fig. 2 is a longitudinal section on line 2 2, Fig. 3. Fig. 3 is a cross-section on line 3 3, Fig. 2.

In the drawings, A A' are the heads or ends of the case, and B B' the side slats connecting the same. The heads are about equal in height to that of a filled basket of fruit to be shipped. With one-pound strawberry-baskets in general use here, the proper height of the heads is three and one-half inches, which is about five-eighths of an inch more than the actual height of the berry-basket to be shipped, thus to accommodate the fruit which projects above the basket. The length of the side walls or slats is such that the interior of the case will exactly chamber a given number of rows of baskets. I prefer to make the chamber of the case or crate thirteen and seven-eighths inches wide by twenty-three and one-half inches long, so as to hold fifteen one-pound baskets in three rows of five baskets.

The bottom of the case is formed of slats C C' C'', one for each longitudinal row of baskets, and the slats are narrower than the bottoms of the baskets, so that the bottoms of the baskets will project over the edges slightly, say one-quarter of an inch. This gives the necessary support and protection to the bottom of the baskets, affords free ventilation through the bottom, and avoids the use of unnecessary material. Berry-baskets in general use taper from top to bottom. With a one-pound box or basket the top is about four and one-half inches square, and the bottom is about four inches square. I use bottom slats three and one-half inches wide and arrange them with their mid-lengths along the lines where the mid-lengths of the longitudinal rows of baskets will come, respectively, when the case is packed for shipment. I use one-half-inch stuff for the heads or ends, one-fourth-inch stuff for the bottom slats, and three-sixteenths-inch stuff for the sides. I make the side slats two and one-half inches wide, and nail them to the heads above the bottom edges thereof, so that there is a space $b$ between the bottom of the side slats and the bottom of the chamber, so that air will be freely admitted between the baskets D.

E indicates the lid, which is formed of veneers about one-eighth of an inch thick provided on the under side with six transverse lid truss basket-and-cover-clamping bars $e\ e'$, &c., arranged at suitable distances apart to rest upon the transverse rows, respectively, of the upper edges of the baskets to clamp the baskets firmly against the bottom slats and also to bind the paper cover F firmly between the truss-bars and the edges of the baskets, and press it down gently upon the berries to hold them in their faced position. The truss-bars are one-fourth of an inch stuff and are five-eighths of an inch wide.

When the lid E is placed in position upon the top of the frame formed by the heads and sides, as shown in Fig. 1, with the truss-bars $e'\ e^2$, &c., resting upon the covering-sheet F and clamping it upon the joining edges of each two adjacent transverse rows of baskets, the bars, the diverging walls of the baskets, the bottom slats, and the frame formed by the heads and sides form a truss capable of bearing a very great strain, and the sheet F will hold the joint firmly in place and prevent it from becoming unfaced. Although the sides of the baskets are thin, yet by this arrangement they brace each other and form such a rigid support for the lid that I have found in practice that it will admit of a person seating himself upon one of my filled crates, having a lid of less than one-eighth of an inch in thickness without in any way injuring the fruit package.

In my improved package I provide means for firmly, yet gently holding the fruit in its faced position in the fruit-baskets.

F indicates a sheet of paper somewhat longer than the case or crate. This thin flexible fruit-covering sheet is spread upon the top of the baskets of fruit after they are placed in position in the crate and properly faced, as shown in the drawings, and is clamped between the truss-bars and the transverse edges of the baskets. The truss-bars draw the sheet firmly and smoothly down upon the fruit, and when the lid is nailed upon the frame of the case the ends of the paper fruit-cover F are firmly gripped and the paper held tight, so that the package may be turned upside down without causing the fruit to be disturbed from its faced position.

When completed the package is very rigid and durable, and yet the completed case for fifteen one-pound baskets weighs less than three pounds. Berries as customarily prepared for market when packed in one-pound baskets weigh slightly less than one pound, basket and all. By reason of this short weight of the baskets I am enabled by the reduction I have made in the weight of the case to bill the entire crate containing fifteen one-pound baskets of fruit at fifteen pounds, the custom of the express companies being to rate by five-pound gradations, all gradations over two and one-half pounds being counted five pounds in their favor, and all under two and one-half pounds being counted in favor of the shipper. By my improved construction I bring the total weight of the crate and berries below seventeen and one-half pounds, so that thereby the shipper does not have to pay any freight upon his berry-crate. I am also enabled, by reason of the small amount of lumber required, to manufacture the crates at less than one-fifth the cost of the two-layer berry-crates, so that it is cheaper for the berry-shipper to sell the crates with the berries than it is to pay for their return.

Owing to the thinness of the truss-bars it is somewhat difficult to rapidly manufacture the lids, and in order to enable workmen to manufacture the same cheaply I will state that this can be done by providing a suitable form arranged to hold the truss-bars and lid-veneers in proper position for nailing, and a stamp or marker adapted to fit in the form over the lid and mark the top of the lid with lines immediately above the several truss-bars. In practice the bars are set on edge in the form, the lid-veneers laid thereon and marked with the marker. The nails or staples for fastening the truss-bars to the lid-veneers can then be rapidly set along these lines, and in this way the lids can be made very easily and quickly.

H indicates a center tie of small wire, which is passed around beneath the middle bottom slat and up along the sides of one of the baskets and through the lid, and there twisted together on top of the lid, by this means to hold the lid firm and tight, and thus bind the package together. In addition to this the lid is held in place by means of nails I driven through the lid into the heads.

The paper cover may be made of tissue paper, either one or two layers being used, as may be preferred. When the package arrives at destination the lid may be removed and the fruit exposed practically to view through the paper without removing, thus giving an attractive appearance and keeping the fruit free from dirt or dust. When the paper is removed the fruit will be found bright and clean, because the paper protects it from dust during transit.

By thus being enabled to ship the berries in a package having only a single layer of baskets, the shipping-case forms a suitable display-case, which can be set at an incline on the fruiterer's stand to display the fruit. The ordinary crate of two or more layers is not adapted for this use.

While I deem it preferable to strengthen the package by the wire tie or band H passed around the middle bottom slat, the fruit-basket, and through the lid and there fastened, as shown in the drawings, I wish my claim to embrace the package with and without such band. I may also add to the number of wire bands, applying one for each row of baskets; or one band might be applied embracing all three of the bottom slats and all the baskets of one transverse row.

I am aware of the patent to I. B. Seeley, No. 310,730, patented January 13, 1885, in which it is proposed to provide a crate-cover with cleats to engage the tops of berry-baskets for the purpose of preventing the same from shifting; but that invention is clearly distinguished from mine, for in it the crate is provided with corner-posts to support the cleats and give strength to the crate, and the baskets do not serve the purpose and are not of such shape as to adapt them to serve the purpose of the baskets in my package. By my invention, I am enabled to dispense with the heavy corner-posts which are necessary in the said patented package. I so use the baskets as to dispense with the posts. My invention over the patented crate consists in using baskets having rectilinear tops and sides fitting closely together at their top edges, dispensing with the corner-posts, and so arranging the cleats and baskets that the baskets will serve the purpose of the corner-posts—that is to say, I utilize the baskets to form braces and trusses and for the purpose of dispensing with constructive weight of crate, which has heretofore been deemed necessary prior to my invention.

Round berry-baskets will not serve the purpose of my invention for two reasons, viz: First, they are impractical, so far as forming the trusses and braces is concerned, and therefore will not admit of the reduction in weight of crate my invention provides for. Second. With round baskets the flexible sheet would not hold the fruit in place.

Now, having described my invention, what I claim as new, and desire to secure by Letters Patent, is—

1. The combination of the frame composed of the heads, the sides narrower than the heads and secured thereto above the bottom edges of the heads; the berry baskets having rectilinear tops and sides and being of less height than the heads fitted in the frame and arranged in rows; the bottom slats, each narrower than the bottom of one of the baskets and arranged respectively, one beneath each longitudinal row of baskets; the lid provided with the transverse truss bars arranged pressing upon the transverse rows of the upper edges of the walls of the baskets; the fruit cover clamped between such walls and truss bars; and means for fastening the lid in place.

2. The combination of the frame, composed of the heads and sides; the berry baskets having rectilinear tops and sides, and fitted in the frame in rows with their sides fitting closely together at their top edges; the bottom slats, each narrower than the bottom of one of the baskets and arranged beneath a row of baskets; the lid provided with the transverse truss bars arranged to press upon the transverse rows of the upper edges of the walls of the baskets, and the wire passed around the middle bottom slat and around one of the baskets and through the lid and fastened to form a band.

3. In a berry package, the combination set forth of the berry baskets having rectilinear tops and sides, and arranged in rows in the frame on the bottom of the case with their sides fitting closely together at their top edges; the
5 lid provided with the transverse truss bars arranged to press upon the edges of the baskets; and the flexible fruit covering sheet clamped between the truss bars and the edges of the baskets as set forth.

SAMUEL W. FUNK.

Witnesses:
JAMES R. TOWNSEND,
H. A. FUNK,
DAVID A. NORCROSS.